US011420506B2

(12) United States Patent
Gouldie et al.

(10) Patent No.: US 11,420,506 B2
(45) Date of Patent: Aug. 23, 2022

(54) MODULAR AND COLLAPSIBLE VEHICLE FRAME FOR ATTACHING TO A VEHICLE BODY

(71) Applicant: MODZ Mold Patent, LLC, Austin, TX (US)

(72) Inventors: Aaron Gouldie, Austin, TX (US); Alan Basta, Austin, TX (US)

(73) Assignee: MODZ MOLD PATENT, LLC, Austin, TX (US)

(*) Notice: Subject to any disclaimer, the term of this patent is extended or adjusted under 35 U.S.C. 154(b) by 0 days.

(21) Appl. No.: 17/162,895

(22) Filed: Jan. 29, 2021

(65) Prior Publication Data
US 2021/0245591 A1    Aug. 12, 2021

Related U.S. Application Data

(60) Provisional application No. 62/975,040, filed on Feb. 11, 2020.

(51) Int. Cl.
*B60J 7/16* (2006.01)
(52) U.S. Cl.
CPC .................... *B60J 7/1628* (2013.01)
(58) Field of Classification Search
CPC .. B60J 7/1628; B60J 7/102; B60J 7/10; Y10S 280/05
USPC ......................................... 296/102, 105, 218
See application file for complete search history.

(56) References Cited

U.S. PATENT DOCUMENTS

| 4,813,734 | A | * | 3/1989 | Hoover ................... B60J 7/102 296/102 |
| 6,439,637 | B1 | | 8/2002 | Tyrer |
| 6,547,304 | B1 | | 4/2003 | Conner et al. |
| 6,557,922 | B1 | * | 5/2003 | Hommel ................. B60J 7/165 296/107.17 |
| RE38,272 | E | | 10/2003 | Nation |

(Continued)

OTHER PUBLICATIONS

Frugal Dougal's Golf Cart Accessories, Golf Cart Roofs, Tops & Canopies, Frugal Dougal's Golf Cart Accessories, Sep. 10, 2020, <http://www.frugaldougalsgolf.com/product/x33>.

(Continued)

*Primary Examiner* — D Glenn Dayoan
*Assistant Examiner* — Kevin P Weldon
(74) *Attorney, Agent, or Firm* — Craige Thompson; Thompson Patent Law; Timothy D. Snowden

(57) ABSTRACT

Apparatus and associated methods relate to a modular vehicle roof frame with at least two support members having at an upper end at least one coupling member through which the support member is axially assembled and releasably coupled to a plurality of top frame members such that each top frame member is releasably coupled to a plurality of support members. In an illustrative example, when the frame is assembled the support members may be substantially vertical and the top frame members may be substantially horizontal. When the frame is coupled to a vehicle the coupling members may, for example, be oriented substantially parallel to a longitudinal axis of the vehicle. The frame may be assembled, for example, by alternately assembling top frame members and support members. Various embodiments may advantageously allow a disassembled frame to be stored within a small sized container suitable for various ground shipping services.

20 Claims, 3 Drawing Sheets

(56) References Cited

U.S. PATENT DOCUMENTS

| | | | |
|---|---|---|---|
| 6,663,162 B1 | 12/2003 | Tyrer | |
| 6,883,846 B2 | 4/2005 | Cheek et al. | |
| 6,902,220 B2 | 6/2005 | Moskos et al. | |
| 6,926,334 B1 | 8/2005 | Diehm | |
| 6,942,279 B1 * | 9/2005 | Hoover | B60J 7/10 135/88.13 |
| 6,979,044 B2 | 12/2005 | Tyrer | |
| D569,333 S | 5/2008 | Hartford | |
| 7,418,918 B2 * | 9/2008 | Bierbower | B63B 17/02 114/361 |
| 7,677,634 B2 * | 3/2010 | Flynn | B60J 7/1226 296/107.17 |
| 8,757,662 B2 | 6/2014 | Deschambault | |
| 8,998,253 B2 * | 4/2015 | Novotny | B60K 5/00 280/756 |
| 9,499,033 B1 | 11/2016 | Nixon et al. | |
| 10,639,979 B1 * | 5/2020 | Jaschke | B60J 7/1278 |
| 2008/0265611 A1 | 10/2008 | Flynn | |
| 2011/0174448 A1 | 7/2011 | Haagenson | |
| 2011/0298189 A1 * | 12/2011 | Schneider | B62D 23/005 296/64 |
| 2014/0117653 A1 | 5/2014 | Deschambault | |
| 2014/0367990 A1 * | 12/2014 | Dost | B62D 33/044 29/428 |
| 2017/0043686 A1 | 2/2017 | Moore et al. | |

OTHER PUBLICATIONS

Jason's Golf Cart Accessories, Yamaha G14-G19 Roof Assembly 56, Jason's Golf Cart Accessories, Apr. 27, 2020, <https://www.jasonsgolfcarts.com/Yamaha_G14_G19_Roof_Assembly_56_p/50269.htm>.

Quadratec, MasterTop Factory Style Bow Replacement Bow Assembly for 97-06 Jeep Wrangler TJ, Quadratec, Apr. 27, 2020, <https://www.quadratec.com/p/mastertop/factory-style-bow-replacement-bow-assembly-jeep-wrangler-tj-15430201>.

Top Deck Golf Carts, Port Aransas Golf Cart / Beach Buggy Rentals, Top Deck Golf Carts, Sep. 10, 2020, <https://www.topdeckgolfcarts.com/>.

Top Deck Golf Carts, Port Aransas Photo Gallery, Sep. 10, 2020 <https://www.topdeckgolfcarts.com/gallery/>.

Top Deck Golf Carts, Top Deck golf carts—Port Aransas, Texas, Facebook, May 8, 2020, <https://www.facebook.com/pg/topdeckgolfcarts/photos/?ref=page_internal>.

\* cited by examiner

MODULAR AND COLLAPSIBLE VEHICLE FRAME FOR ATTACHING TO A VEHICLE BODY

CROSS-REFERENCE TO RELATED APPLICATIONS

This application claims the benefit of U.S. Application Ser. No. 62/975,040, titled "Modular and Collapsible Vehicle Frame for Attaching to a Vehicle Body," filed by Aaron Gouldie, et al., on Feb. 11, 2020.

This application incorporates the entire contents of the foregoing application(s) herein by reference.

TECHNICAL FIELD

Various embodiments relate generally to vehicle body accessories.

BACKGROUND

Vehicles come in a variety of shapes, forms, and purposes. For example, on-road land vehicles may be used for rapid, long-distance inter-property transportation. Off-road land vehicles may, for example, be used for short-distance, intra-property transportation. Vehicles may further be adapted for air and/or water travel.

Various vehicles may be provided, for example, with various body configurations. Automobiles, all-terrain/recreational/utility vehicles, boats, and other vehicles may be provided, for example, with open passenger seating, closed cabs, or some combination thereof.

SUMMARY

Apparatus and associated methods relate to a modular vehicle roof frame with at least two support members having at an upper end at least one coupling member through which the support member is axially assembled and releasably coupled to a plurality of top frame members such that each top frame member is releasably coupled to a plurality of support members. In an illustrative example, when the frame is assembled the support members may be substantially vertical and the top frame members may be substantially horizontal. When the frame is coupled to a vehicle the coupling members may, for example, be oriented substantially parallel to a longitudinal axis of the vehicle. The frame may be assembled, for example, by alternately assembling top frame members and support members. Various embodiments may advantageously allow a disassembled frame to be stored within a small sized container suitable for various ground shipping services.

Various embodiments may achieve one or more advantages. For example, some embodiments may, when disassembled, presenting generally planar aspect with minimal thickness compared to length and width. Various embodiments may, for example, advantageously permit shipment of a disassembled frame through a standard ground parcel carrier. In various embodiments axially assembled coupling members and top frame members with mechanically secured joints may advantageously provide rigidity while preserving the ability to be shipped in a disassembled form. Various embodiments may advantageously incorporate a rearward facing seat into the frame.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
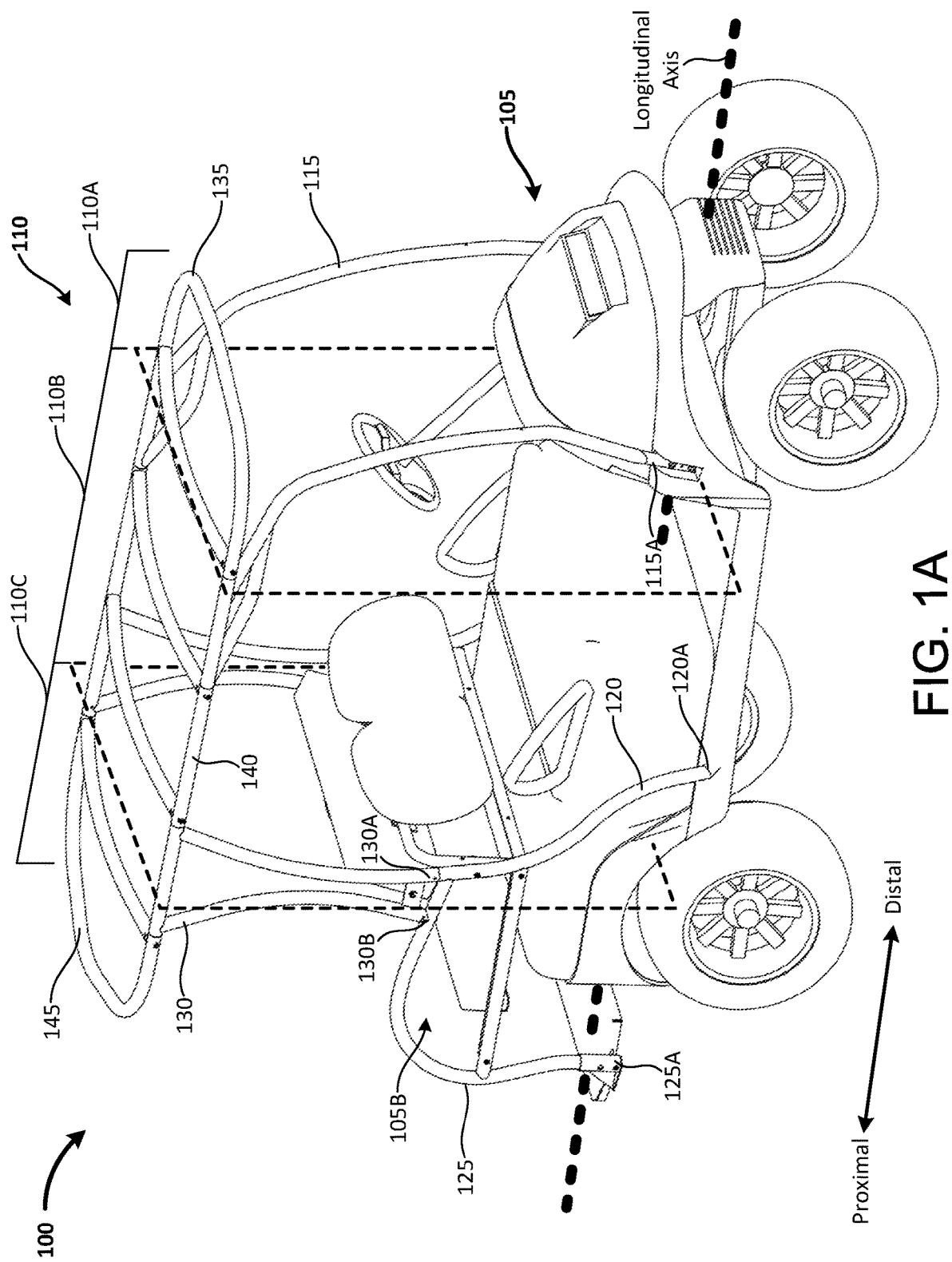
FIG. 1A depicts a front right perspective view of an exemplary golf cart vehicle outfitted with an exemplary modular and collapsible vehicle frame.

FIG. 1A depicts a front right perspective view of an exemplary golf cart vehicle outfitted with an exemplary modular and collapsible vehicle frame. A vehicle system 100 includes a golf cart (or another vehicle) 105. The golf cart 105 is shown outfitted with an exemplary modular and collapsible vehicle frame 110. The modular and collapsible vehicle frame 110 is formed of multiple rigid members, which are configured to assemble together to form the assembled vehicle frame 110. Collapsing of the frame into a disassembled state may advantageously allow the disassembled vehicle frame to be stored within a small sized container that is suitable for ground shipping commercially provided by various shipping businesses (e.g., UPS). The collapsible frame may, in various implementations, be generally formed of three sections: a front section 110A, a mid-section 110B, and a back section 110C. Each section 110A, 110B, and 110C may have its own pair of vertically extending support members, along with laterally extending frame members that provide lateral structural support and rigid mechanical linkage between the right and left sides of the frame 110. The structure and shape of the frame 110 may, in various implementations, exhibit plane symmetry about a longitudinally and vertically extending plane that extends through the lateral center of the frame 110 from the front to the back of the frame 110. In other words, the right side of the frame 110 may be a substantial mirror image of the left side of the frame 110.

The frame 110 includes a pair of laterally spaced and opposed front base support members 115 removably fixed at right and left lateral front sides of the golf cart 105, respectively. Located at a proximal end of each front base support 115 is a vehicle front coupler 115A (e.g., an attachment bracket and/or fastener hole). Each vehicle front coupler 115A is configured to mechanically and fixedly couple to an associated front base support 115 at a front lateral side section of the golf cart 105.

The frame 110 includes a pair of laterally spaced and opposed middle base support members 120 removably fixed at right and left lateral middle sides of the golf cart 105, respectively. Located at a proximal end of each middle base support 120 is a vehicle middle coupler 120A (e.g., an attachment bracket and/or fastener hole). Each vehicle middle coupler 120A is configured to mechanically and fixedly couple to an associated middle base support 120 at a middle lateral side section of the golf cart 105.

The frame 110 includes a pair of laterally spaced and opposed back base support members 125 removably fixed at right and left lateral back sides of the golf cart 105, respectively. Located at a proximal end of each front base support 125 is a vehicle back coupler 125A (e.g., an attachment bracket and/or fastener hole). Each vehicle back coupler 125A is configured to mechanically and fixedly couple to an associated front base support 115 at a back lateral side section of the golf cart 105.

The pair of back base supports 125 may be configured as armrests of a back seat of the golf cart 105. The each of the back supports (armrests) 125 is shown being releasably coupled (e.g., via a fastener) to a distal end of a respective one of the middle base supports 120. Each armrest 125 extends longitudinally backward from the associated middle base support 120, and curves (at least partially) vertically downward to terminate at a proximal end having the vehicle back coupler 125A. Each vehicle back couplers 125A mechanically and fixedly couples the associated armrest 125 to an associated lateral side of a footrest 105A of the golf cart 105. The back seat and/or the back seat footrest 105A of the golf cart 105 may be located between the pair of back base supports 125 when the supports 125 are operably coupled to the golf cart 105.

In some examples, a pair of laterally opposed structural support linkages 125B may provide additional structural support by mechanically and rigidly coupling a point along a length of an armrest 125 to a point along the length of a vehicle middle support.

The frame 110 includes a pair of laterally spaced and opposed back upper support members 130, each removably fixed to an associated middle base support member 120. Located at a proximal end of each back upper support 130 is a first intermediate middle coupler 130A (e.g., a male segment and/or fastener hole). Each first intermediate middle coupler 130A is configured to mechanically and fixedly couple to an associated middle base support 120 at a middle(-back) lateral side section of the golf cart 105. Also located at a proximal end of each back upper support 130 is a first intermediate back coupler 130B (e.g., a female segment and/or fastener hole). Each first intermediate back coupler 130B is configured to mechanically and fixedly couple to an associated back base support 125 at a back(-middle) lateral side section of the golf cart 105. Each back supper support 130 is shown as including a front vertically extending member (configured to couple to the middle base support 120) and a back vertically extending member (configured to couple to the back base support 125).

At a top front of the frame 110 is a front top frame member 135 removably fixed to each of the front base supports 115. Removably fixed between the front base supports 115 and the back upper supports 130 is a middle top frame member 140. At a top back of the frame 110 is a back top frame member 145 removably fixed to each of the back upper supports 130. The front and back top frame members 135 are shown arranged as opposite facing U-shaped sections bridged by a laterally extending member (to provide structural support). The middle top frame member 140 may include a pair of longitudinally extending members bridged by a pair of laterally extending members.

Figure 1B:
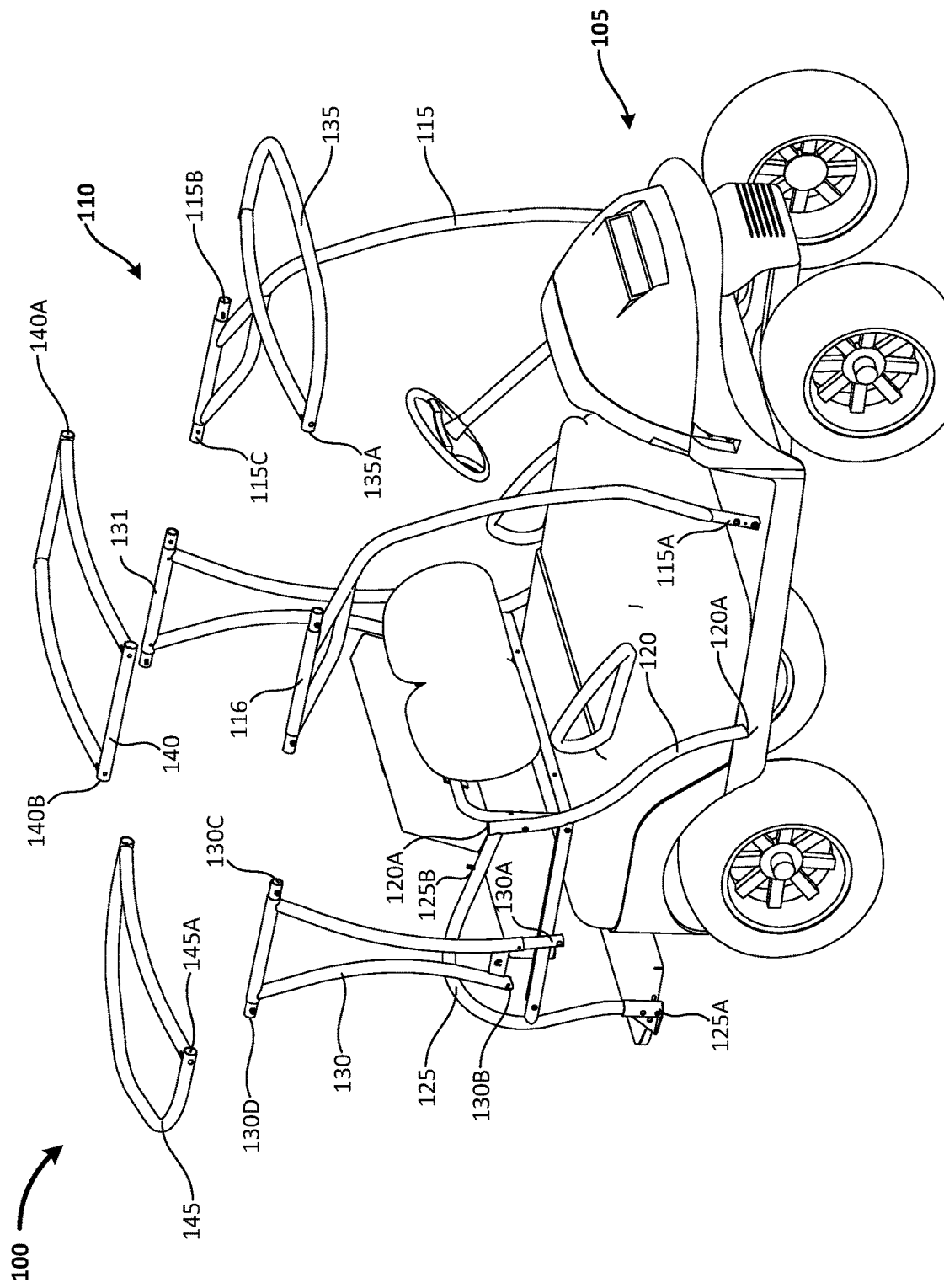
FIG. 1B depicts a front right perspective view of an exemplary golf cart vehicle outfitted with an exemplary modular and collapsible vehicle frame, the modular and collapsible vehicle frame being shown in partially exploded view.

FIG. 1B depicts a front right perspective view of an exemplary golf cart vehicle outfitted with an exemplary modular and collapsible vehicle frame, the modular and collapsible vehicle frame being shown in partially exploded view. The vehicle system 100 is shown where at least some components of the frame 110 are detached from other components of the frame, as well as from the golf cart 105.

The front top frame member 135 includes (at a back end) a pair of front top frame couplers 135A (e.g., a female segment and/or fastener hole). The front top frame couplers 135A are laterally spaced/opposed relative to one another, and configured to removably couple with a complementary pair of front-support front-top couplers 115B of the pair of front base supports 115. In the depicted example, each (male) coupler 115B may be configured to mechanically interface with an associated (female) coupler 135A to removably couple the front top frame member 135 to the pair of front base supports 115.

The middle top frame member 140 includes (at a front end) a pair of front-middle top frame couplers 140A (e.g., a female segment and/or fastener hole). The front-middle top frame couplers 140A are laterally spaced/opposed relative to one another, and configured to removably couple with a complementary pair of front-support back-top couplers 115C of the pair of front base supports 115. In the depicted example, each (male) coupler 115C may be configured to mechanically interface with an associated (female) coupler 140A to removably couple the middle top frame member 140 to the pair of front base supports 115. As depicted, each pair of couplers 115B and 115C on a single front base support 115 is a distal end and proximal end, respectively, of a front longitudinal coupling member 116 disposed at an upper end of the support 115.

The middle top frame member 140 includes (at a back end) a pair of back-middle top frame couplers 140B (e.g., a female segment and/or fastener hole). The back-middle top frame couplers 140B are laterally spaced/opposed relative to one another, and configured to removably couple with a complementary pair of back-support front-top couplers 130C of the pair of back upper supports 130. In the depicted example, each (male) coupler 130C may be configured to mechanically interface with an associated (female) coupler 140B to removably couple the middle top frame member 140 to the pair of back upper supports 130.

The back top frame member 145 includes (at a front end) a pair of back top frame couplers 145A (e.g., a female segment and/or fastener hole). The back top frame couplers 145A are laterally spaced/opposed relative to one another, and configured to removably couple with a complementary pair of back-support back-top couplers 130D of the pair of back upper supports 130. In the depicted example, each (male) coupler 130D may be configured to mechanically interface with an associated (female) coupler 145A to removably couple the back top frame member 145 to the pair of back upper supports 130. As depicted, each pair of couplers 130C and 130D on a single back upper support 130 is a distal end and proximal end, respectively, of a rear longitudinal coupling member 131 disposed at an upper end of the support 115.

Located at a proximal end of each back upper support 130 is the first intermediate middle coupler 130A (e.g., a male segment and/or fastener hole) configured to mechanically interface with a complementary second intermediate middle coupler 120A (e.g., a female segment and/or fastener hole) of an associated middle base support 120. Similarly, located at a proximal end of each back upper support 130 is the first intermediate back coupler 130B (e.g., a female segment and/or fastener hole) configured to mechanically interface with a complementary second intermediate back coupler 125B (e.g., a male segment and/or fastener hole) of an associated back base support 125.

Figure 2:
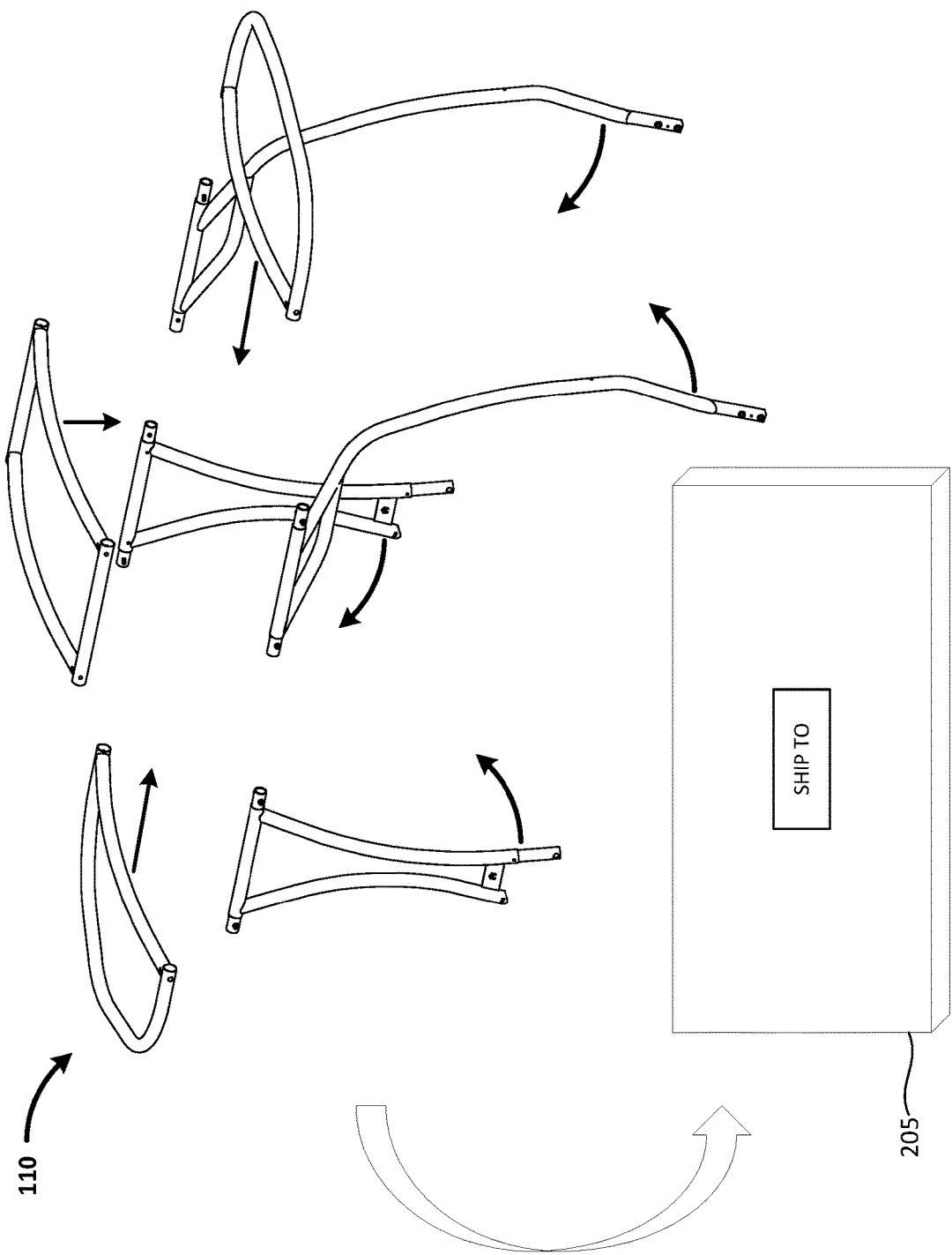
FIG. 2 depicts a view of an exemplary collapsible vehicle frame configured to collapse into a disassembled state, such that the disassembled vehicle frame is configured to fit within a small sized container suitable for shipping and satisfying commercially available shipping requirements.

FIG. 2 depicts a view of an exemplary collapsible vehicle frame configured to collapse into a disassembled state, such that the disassembled vehicle frame is configured to fit within a small sized container suitable for shipping and satisfying commercially available shipping requirements. The frame 110 may be collapsed into a disassembled state, which may advantageously allow the disassembled vehicle frame 110 to be stored within a small sized container 205 that is suitable for ground shipping commercially provided by various shipping businesses (e.g., UPS, FedEx). For example, the frame members may be oriented and arranged together, as shown by the arrows for each member, into a substantially planar configuration. Accordingly, the roof frame may be advantageously configured such that, when disassembled, the members fit within a rectangular box having a length sufficient to receive a longest support member and having height<width<length. The rectangular box may be particularly configured to permit shipment through a standard ground parcel carrier.

Although various embodiments have been described with reference to the Figures, other embodiments are possible. For example, the collapsible vehicle frame may be configured to fit not just golf carts, but also other forms of vehicles. To illustrate, the collapsible vehicle frame may be installed or retrofitted onto an all-terrain vehicle (ATV), a bumper car, and/or a low-speed vehicle (LSV), in various implementations.

In various embodiments, the various frame pieces of a modular frame may be advantageously designed to present, when disassembled, a generally planar aspect with minimal thickness compared to length and width. The roof frame may be advantageously formed by alternately assembling a horizontal top frame member with a pair of vertical support members (e.g., as shown in FIGS. 1A-1B). The top frame members (e.g., 135, 140, 145) may be U-shaped or rectangular-shaped sections bridged by one or more laterally extending member.

In various embodiments, a modular frame may be generally formed of three sections: a front section, a midsection, and a back section such as is illustrated, for example, in FIGS. 1A-2. Each section may be supported by a pair of vertically extending support members (e.g., 115, 130), along with laterally extending top frame members (e.g., 135, 140, 145) that provide lateral structural support and rigid mechanical linkage between the right and left sides of the frame. The right side of the frame may be a substantial mirror image of the left side of the frame. In various embodiments, two, three, four, five, or more sections may be provided. For example, various embodiments may advantageously allow (center) sections (e.g., top frame members and/or support members) to be modularly field assembled to a desired length.

In various embodiments each vertical support member (e.g., 115, 130) may be provided at an upper end with a horizontal coupling member (e.g., 116, 131, respectively). The horizontal coupling member may axially assemble and releasably couple to top frame members (e.g., 135, 140, 145) to form a continuous frame lying in a horizontal plane. The vertical support member pairs (e.g., pair 115 and pair 130) may be configured to alternatingly assemble with the top frame members in a longitudinal direction. When assembled, the members may releasably but rigidly couple to form a rigid roof frame suspended over the vehicle. When disassembled, the members may be capable of aligning in a substantially planar grouping to advantageously permit shipment by common ground carrier.

The various members may be made of hollow channels (e.g., tubular), having male and female ends which are axially assembled. The resulting joints may be mechanically secured (e.g., by bolts or other mechanical fasteners). The axially assembled hollow channels with mechanically secured joints may advantageously provide rigidity while preserving the ability to be shipped in a disassembled form. In particular, each vertical support member's horizontal coupler may be provided with two ends configured to axially assemble with mating ends of respective top frame members (as shown in FIG. 1A-1B).

In various embodiments, the front vertical support members may, for example, have a forward-curving convex shape (e.g., 115), which may advantageously provide additional room for a user to enter the vehicle while maintaining a substantially planar geometry of the support member when disassembled. Each rear vertical support member (e.g., 130) may include a pair of longitudinally spaced vertical members connected at an upper end by the horizontal coupler (as shown in FIG. 1A-2A).

In various embodiments a vehicle (e.g., golf cart 105) may be outfitted with an exemplary modular and collapsible vehicle frame (e.g., 110). A windshield may, for example, be affixed to front base supports (e.g., the pair of front base supports 115). In various embodiments a coupler (e.g., 125A) may be removably affixed to a back seat footrest (e.g., 105A) associated with a back seat (e.g., 105B) of the golf cart 105. In various embodiments, the frame 110 (e.g., support linkages 125B and/or middle base supports 120) may include various fasteners configured to releasably and fixedly mount the frame 110 to various hardware components of the golf cart 105. In various embodiments one or more support bridge/linkages may be configured to provide additional rigid support for vertically extending members (e.g., back and middle) of a back upper support (e.g., 130). In various embodiments a vehicle front coupler (e.g., 115A, such as a mounting bracket) may removably affix an associated front base support (e.g., 115) with a front (right) lateral section of the golf cart 105.

Various fasteners (e.g., bolts/screws, holes/bosses, male/female members) may be used to mechanically couple components of the frame 110 to one another, as well as to the golf cart 105 or another vehicle. In various implementations, components of the frame may be rigidly, yet removably/releasably fixed to one another when operably coupled/assembled. Some components may further collapse into sub-components (e.g., the front base support 115 may be configured at two or more separate members, similar to the middle base support 120 and the front vertically extending member of the back upper support 130). Various embodiments may be formed of hard metal or plastic (e.g., aluminum, steel, stainless steel, ABS plastic). A shipping box (e.g., 205) may have a small-sized footprint such that a collapsed frame (e.g., 110) can be advantageously shipped by ground instead of by freight.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus comprising a modular vehicle roof frame comprising:
   a plurality of top frame members; and,
   at least three support members, each support member comprising at least one coupling member disposed at a first end of the support member and through which the support member is configured to be axially assembled and releasably coupled to at least two of the at least three top frame members,
   wherein:
      each top frame member is configured to be releasably coupled to a corresponding at least two of the at least three support members,
      each coupling member is oriented such that, when the modular vehicle roof frame is in an assembled state, the corresponding support member extends out of a plane passing through the at least one coupling member and at least one other coupling member releasably coupled to the corresponding top frame member,
      an axially assembled coupling member and corresponding frame member comprises a first of the at least one coupling member and the corresponding frame member configured such that at least some portion is slidably disposed within a lumen of a second of the at least one coupling member and the corresponding frame member,
      at least two of the at least three support members are configured to releasably couple to a vehicle at a second end of each support member, and
      in the assembled state, the coupling members are oriented substantially parallel to a longitudinal axis of the vehicle.

2. The apparatus of claim 1, wherein:
   a first of the at least three support members is configured to releasably and axially couple to distal ends of respective coupling members of a first pair of support members,
   a second of the at least three support members is configured to releasably and axially couple to:
      proximal ends of the respective coupling members of the first pair of the at least three support members, and
      distal ends of respective coupling members of a second pair of the at least three support members, and
   a third support member of the at least three support members is configured to releasably and axially couple to proximal ends of the respective coupling members of the second pair of the at least three support members.

3. The apparatus of claim 1, wherein the apparatus is configured such that, when the apparatus is releasably coupled to the vehicle in the assembled state, the plurality of top frame members are supported in an orientation substantially parallel to a chassis of the vehicle.

4. The apparatus of claim 1, wherein each coupling member comprises a first end, a second end, and a length between the first end and the second end, such that when the coupling member is releasably coupled to the corresponding at least two top frame members, a first top frame member is releasably coupled to the first end, a second top frame member is releasably coupled to the second end, and the at least two top frame members are spaced apart from one another by the length between the first end and the second end.

5. The apparatus of claim 1, wherein at least one of the top frame members has a substantially concave upward lateral profile when the modular vehicle roof frame is releasably coupled to the vehicle in the assembled state.

6. The apparatus of claim 1, wherein, when the modular vehicle roof frame is releasably coupled to the vehicle in the assembled state:
   at least two of the at least three support members are positioned distally to a front seat of the vehicle, and
   at least one of the two of the at least three support members has a substantially concave forward vertical profile towards a distal end of the vehicle.

7. An apparatus comprising a modular vehicle roof frame comprising:
   a plurality of top frame members; and,
   a plurality of support members, each support member comprising at least one coupling member disposed at a first end of the support member and through which the support member is configured to be axially assembled and releasably coupled to at least two of the plurality of top frame members,
   wherein:
      each top frame member is configured to be releasably coupled to at least two of the plurality of support members,
      each coupling member is oriented such that, when the modular vehicle roof frame is in an assembled state, the corresponding support member extends out of a plane passing through the coupling member and at least one other coupling member releasably coupled to the corresponding top frame member, and
      in a disassembled state, each of the plurality of support members are independent of the plurality of top frame members.

8. The apparatus of claim 7, wherein:
   a first of the plurality of support members is configured to releasably and axially couple to distal ends of respective coupling members of a first pair of the plurality of support members,
   a second of the plurality of support members is configured to releasably and axially couple to:
      proximal ends of the respective coupling members of the first pair of the plurality of support members, and
      distal ends of respective coupling members of a second pair of the plurality of support members, and
   a third support member of the plurality of support members is configured to releasably and axially couple to proximal ends of the respective coupling members of the second pair of the plurality of support members.

9. The apparatus of claim 7, wherein axial assembly of a coupling member and corresponding frame member comprises at least some portion of at least one of the coupling member and the corresponding frame member slidably inserting into a lumen of the other.

10. The apparatus of claim 9, wherein a releasably coupled coupling member and corresponding frame member comprises a mechanical element disposed in at least one aperture of the coupling member and at least one corresponding aperture of the corresponding frame member.

11. The apparatus of claim 7, wherein each coupling member is permanently fixed to the respective support member.

12. The apparatus of claim 7, wherein each support member is configured to releasably couple to a vehicle at a second end of the support member.

13. The apparatus of claim 7, wherein the apparatus is configured such that, when releasably coupled to a vehicle in an assembled state:

the plurality of top frame members are supported in an orientation substantially parallel to a chassis of a vehicle, and the plurality of top frame members are supported over at least one seat in the vehicle.

14. The apparatus of claim 13, wherein the apparatus is configured such that, in the assembled state, the coupling members are oriented substantially parallel to a longitudinal axis of the vehicle.

15. The apparatus of claim 7, wherein each coupling member comprises a first end, a second end, and a length between the first end and the second end, such that when the coupling member is releasably coupled to the corresponding at least two top frame members, a first top frame member is releasably coupled to the first end, a second top frame member is releasably coupled to the second end, and the at least two top frame members are spaced apart from one another by the length between the first end and the second end.

16. The apparatus of claim 7, wherein at least one portion of each top frame member configured to releasably couple to a corresponding coupling member is of tubular construction.

17. The apparatus of claim 7, wherein at least one portion of each of the coupling members configured to releasably couple to a corresponding top frame member is of tubular construction.

18. The apparatus of claim 7, wherein at least one of the top frame members has a substantially concave upward lateral profile when the modular vehicle roof frame is releasably coupled to a vehicle in an assembled state.

19. The apparatus of claim 7, wherein, when the modular vehicle roof frame is releasably coupled to a vehicle in an assembled state:

at least two of the plurality of support members are positioned distally to a front seat of the vehicle, and at least one of the two of the plurality of support members has a substantially concave forward vertical profile towards a distal end of the vehicle.

20. The apparatus of claim 7, wherein the plurality of support members and the plurality of top frame members are configured to be arranged, in the disassembled state, such that they fit into a substantially rectangular container having a length sufficient to receive a longest of the plurality of support members and having a height and a width less than the length.

* * * * *